United States Patent

Maruyama

[15] 3,664,490
[45] May 23, 1972

[54] JOINT REINFORCED CONVEYOR BELT
[72] Inventor: Hideyo Maruyama, Yokohama, Japan
[73] Assignee: Bridgestone Tire Company Limited, Tokyo, Japan
[22] Filed: Sept. 12, 1969
[21] Appl. No.: 857,433

[30] Foreign Application Priority Data

Sept. 30, 1968 Japan..................................43/84138

[52] U.S. Cl. .................................198/193, 24/31 R, 74/237
[51] Int. Cl. ........................................................B65g 15/30
[58] Field of Search...............198/193; 24/31 W, 31 C, 33 R, 24/31 R, 33 V; 74/231, 237; 305/35–39

[56] References Cited

UNITED STATES PATENTS 3,368,417 2/1968 Jenkins....................................74/237

FOREIGN PATENTS OR APPLICATIONS 1,372,099 8/1964 France....................................24/31 R Primary Examiner—Joseph Wegbreit
Assistant Examiner—Hadd S. Lane
Attorney—Stevens, Davis, Miller & Mosher

[57] ABSTRACT

Joint reinforced conveyor belt comprising a conveyor belt including a rubber cover and a belt core embedded therein and formed at each end with recesses and projections to be engaged with corresponding projections and recesses of another conveyor belt. Each projection has embedded therein a doubled holed link having two holes at each end. Extending through one of the holes is a joint rod, while extended through the other hole is a spindle. Cords are wound around the spindle end of all of the double holed links and extended in a lengthwise direction of the conveyor belt and embedded in the rubber cover and serve to transmit uniformly the tension applied to the belt core of the conveyor belt all over the width of the belt conveyor.

4 Claims, 6 Drawing Figures

JOINT REINFORCED CONVEYOR BELT

This invention relates to a joint reinforced conveyor belt.

In general, a joint reinforced conveyor belt makes use of a vulcanized joint and a metal fitting joint. The vulcanized joint has a high joint efficiency of the order of 50 – 95 percent, but cannot be constructed in an easy and inexpensive manner. The metal fitting joint can be constructed in a simple and easy manner; it has a low joint efficiency of the order of 20 – 45 percent.

In the past there has been proposed a joint reinforced belt conveyor comprising a conveyor belt including a rubber cover and a belt core embedded therein, recesses and projections formed at each end of the conveyor belt, a tube embedded in each of the projections, a joint rod extending through the tube, and cords wound around the tube and extending in a lengthwise direction of the conveyor belt and embedded in the cover rubber.

The above mentioned joint reinforced belt conveyor makes it possible to form a joint between the ends of two conveyor belts. But, in such a construction, the cords wound around the tube are embedded in the projections of the conveyor belt, while no cords are embedded in the recesses of the conveyor belt. Thus, the theoretical joint efficiency of the construction is less than 50 percent which is far inferior to that of the vulcanized joint.

It is, therefore, an object of this invention to provide an improved joint reinforced conveyor belt having a high joint efficiency and adapted to be constructed in an easy and inexpensive manner.

A feature of the invention is directed to an improved joint reinforced conveyor belt comprising a conveyor belt having a rubber cover and a belt core embedded therein, recesses and projections formed at each end of the conveyor belt, a double holed link having two holes at each end and embedded in each of said projections, a joint rod extending through one of the holes of said double holed link, a spindle extending through another hole of said double holed link, cords wound around said spindle and all of said double holed links and extending in a lengthwise direction of the conveyor belt and embedded in the rubber cover.

In preferred embodiments of this invention, the cords wound around the spindle and all of the double holed links extend along the top and bottom surfaces of the belt core embedded in the rubber cover. Alternatively, the cords may be extended through the belt core. The cords are formed of metal wire cords and if desired may be formed of fibrous cords. The double holed link is formed of metal. Alternatively, the double holed link may be formed of a synthetic resin such as epoxy resin having a core made of glass fiber embedded therein.

The spindle extending through another hole of the double holed link is formed of twisted metal wire cords.

The invention and the advantages thereof will be more clearly understood from the following detailed description when taken in conjunction with the accompanying drawings wherein.

Figure 1:
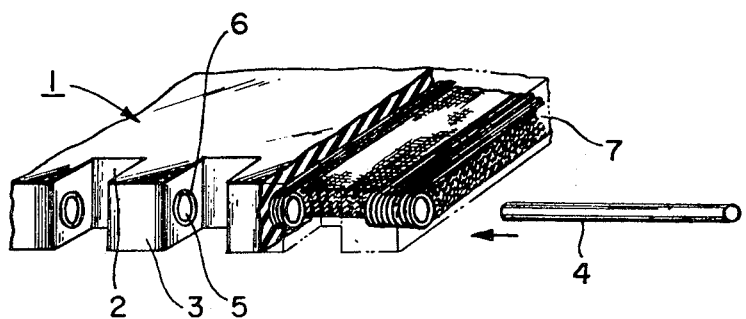
FIG. 1 is a perspective view of a portion of a conventional joint reinforced conveyor belt in partial section.
Figure 2:
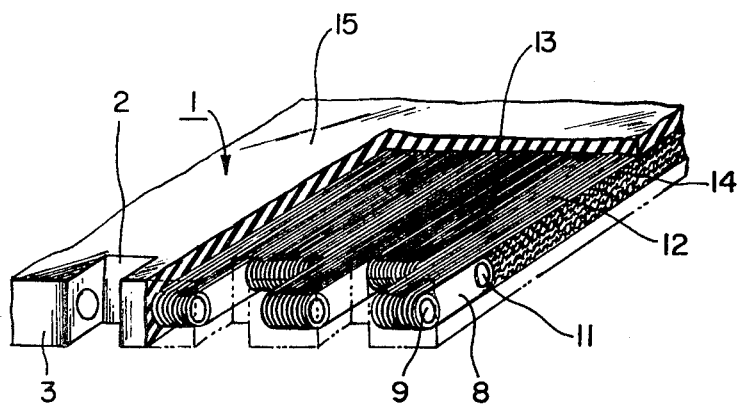
FIG. 2 is a perspective view of a portion of a preferred embodiment of a joint reinforced conveyor belt according to the invention in partial section.
Figure 3:
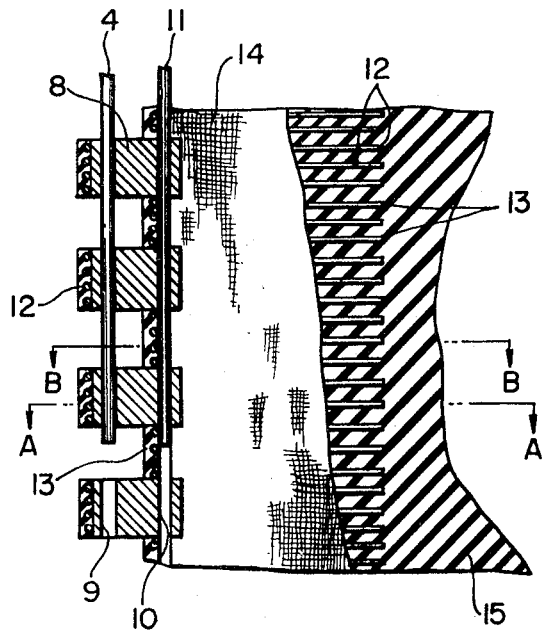
FIG. 3 is its transverse section partially in section on another plane.

Referring to FIG. 1, there is shown a conventional joint reinforced conveyor belt 1 provided at each end to be joined with recesses 2 and projections 3 adapted to be engaged with corresponding projections 3 and recesses 2 of another conveyor belt 1. These projections 3 are provided with holes 5 aligned opposite each other. Tubes 6 are embedded in holes 5. A joint rod 4 is extended through all of tubes 6.

In order to rigidly hold and make stationary the tubes 6 at their embedded positions, wire cords 7 are wound around the tubes 6. Then, the recesses 2 are brought into engagement with corresponding projections 3 of another belt conveyor and the tubes 6 of the engaged projections 3 are brought into alignment with each other. Thereafter, the joint rod 4 is inserted into the aligned tubes 6. Thus, it is possible to join the ends of two conveyor belts 1. But, in such a construction the wire cords 7 wound around the tubes 6 are embedded in the projections 3 of the conveyor belt 1, while no wire cords 7 are embedded in the recesses 2 of the conveyor belt 1. Thus, the theoretical joint efficiency of the above described construction is less than 50 percent which is far inferior to that of the vulcanized joint.

Figure 4:
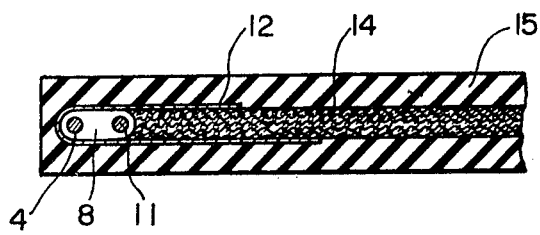
FIG. 4 is a section on line A—A of FIG. 3.
Figure 5:
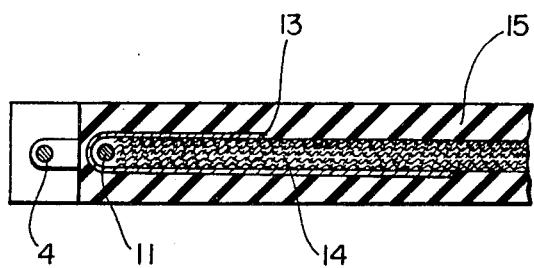
FIG. 5 is a section on line B—B of FIG. 3.
Figure 6:
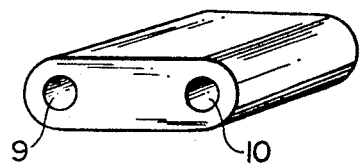
FIG. 6 is a perspective view of a double holed link.

Now, referring to FIGS. 2 – 6, there is shown a joint reinforced conveyor belt 1 according to this invention which is provided at its ends to be joined with recesses 2 and projections 3 adapted to be engaged with corresponding projections 3 and recesses 2 of another conveyor belt 1. In accordance with this invention, use is made of a double holed link 8 as shown in FIG. 6 having two holes 9 and 10 at each end in place of the pipe 6 of the conventional joint reinforced conveyor belt 1 shown in FIG. 1.

The double holed link 8 has a length which is substantially equal to the length of the projection 3 and a width which is substantially equal to the width of the projection 3. It is preferable to make the thickness of the double holed link 8 less than that of the conveyor belt so as to be embedded in a rubber cover 15. Each end of the double holed link 8 adjacent to the holes 9 and 10 is rounded as shown in FIG. 6.

Each double holed link 8 is embedded in the projection 3 of the conveyor belt 1 in a manner such that its hole 9 is located at that part of the projection 3 which is inwardly adjacent to the top surface of the projection 3, while the other hole 10 is located at that part of the recess 2 which is inwardly adjacent to the bottom surface of the recess 2. The holes 9 and 10 are aligned so that a joint rod 4 can be inserted into the aligned holes 9 and a spindle 11 can be inserted into the aligned holes 10.

Wire cords 12 are wound around the double holed links 8, while wire cords 13 are wound around the spindle 11 so as to rigidly hold and make stationary the double holed links 8 embedded in the cover rubber 15. The wire cords 12 and 13 may be formed of twisted metal wire cords and, if desired, may be formed of fibrous cords.

The spindle 11 and the double holed links 8 serve to transmit the tension applied to belt core 14 of the conveyor belt 1 through the wire cords 12 and 13 to the total width of the conveyor belt 1. Thus, the invention makes it possible to increase the tension of the belt conveyor 1 until the joint efficiency reaches substantially 100 percent, which is comparable with that of the vulcanized joint.

The spindle 11 may be formed of twisted metal wire cords. In this case, the conveyor belt 1 becomes flexible and hence is capable of carrying any article on the conveyor belt 1 in an ideal condition irrespective of the load subjected to the conveyor belt 1 due to the weight of the article.

The belt core 14 may be formed of canvas or steel cords. The double holed links 8, the spindle 11, the wire cords 12, 13, and the belt core 14 are all covered by the rubber cover 15.

The wire cords 12 and 13 wound around the double holed links 8 and the spindle 11 extend in a lengthwise direction of the conveyor belt. In the embodiment shown, the wire cords 12 and 13 extend along the top and bottom surfaces of the belt core 14 embedded in the rubber cover 15.

Alternatively, the wire cords 12 and 13 may be extended through the belt core 14.

The wire cords 12 and 13 serve to transmit the tension applied to the belt core 14 and hence the length of the wire cords 12 and 13 is determined by the mechanical strength of the belt core 14.

The length of the wire cords 12 and 13 at the top surface of the belt core 14 is made shorter than that of the wire cords 12 and 13 at the bottom surface of the conveyor belt as shown in FIGS. 4 and 5. This difference in length of the wire cords 12 and 13 at the top and bottom surfaces of the belt core 14 prevents the joint portion of the conveyor belt 1 engaging with a pulley from becoming flexible.

If the length of the wire cords 12 and 13 at the top surface of the belt core 14 is equal to that of the wire cords 12 and 13 at the bottom surface of the belt core 14, it is possible to make the joint portion of the conveyor belt 1 flexible.

The double holed links 8 embedded in the projections 3 of the joint are formed of shear resisting material, such as metal or synthetic resin, for example, epoxy resin having a core made of glass fiber embedded therein.

As explained hereinbefore, the use of the double holed links 8 provided at its ends with holes 9 and 10 and embedded in the projections 8 of the conveyor belt 1 permits one of the holes 9 to be used as a joint hole and further provide the important advantage that a group of cords wound around the spindle 11 extend-ing through the other hole 10 and around all of the double holed link 8 serve to transmit uniformly the tension applied to the belt core 14 of the conveyor belt 1 all over the width of the belt conveyor 1, thereby increasing the joint efficiency.

It will be obvious that the invention is not restricted to the example described and that many variations are possible to those skilled in the art without departing from the scope of this invention.

What is claimed is:

1. A joint reinforced conveyor belt comprising
a conveyor belt including a rubber cover and a belt core embedded therein,
longitudinally extending recesses and projections formed at each end of the conveyor belt,
links, each having a width which is substantially equal to the width of each projection, one link embedded in each projection, each link having a transverse inner and outer hole, relative to the projections,
a joint rod extending through the outer holes of said links to join the ends of said belt, two spindles, one at each end of the belt extending through said inner holes
cords wound about said spindles and all of said links, extending lengthwise of said belt and embedded in said cover, said links and spindles transmitting the tension of said cords wound about said spindles to said joint rod.

2. A joint reinforced conveyor belt as claimed in claim 1 wherein said link is formed of metal.

3. A joint reinforced conveyor belt as claimed in claim 1 wherein said link is formed of a synthetic resin such as epoxy resin having a core made of glass fiber embedded therein.

4. A joint reinforced conveyor belt as claimed in claim 1 wherein said spindles are formed of twisted metal wire cords.

* * * * *